United States Patent [19]

Endo et al.

[11] Patent Number: 5,139,683
[45] Date of Patent: Aug. 18, 1992

[54] METHOD OF ORGANIC SOLVENT REMOVAL

[75] Inventors: Kiyoshi Endo; Masami Ishikura, both of Tokyo, Japan

[73] Assignee: Konica Corporation, Tokyo, Japan

[21] Appl. No.: 664,126

[22] Filed: Mar. 4, 1991

[30] Foreign Application Priority Data

Mar. 6, 1990 [JP] Japan .................................. 2-54250

[51] Int. Cl.$^5$ .............................................. B01D 19/02
[52] U.S. Cl. ....................................... 210/744; 55/55;
55/87; 55/164; 55/178; 159/DIG. 4; 210/808;
210/104; 202/264; 203/20
[58] Field of Search ...................... 55/55, 87, 164, 178;
159/DIG. 4; 210/744, 808, 86, 100, 104;
202/264; 203/20

[56] References Cited

U.S. PATENT DOCUMENTS

| | | | |
|---|---|---|---|
| 3,249,566 | 5/1966 | May | 203/20 |
| 3,904,392 | 9/1975 | Van Ingen et al. | 159/DIG. 4 |
| 3,985,626 | 10/1976 | Klein | 55/164 |
| 4,342,654 | 8/1982 | Lambert | 210/744 |
| 4,935,151 | 6/1990 | Do | 55/55 |
| 5,044,761 | 9/1991 | Yuhki et al. | 55/55 |

FOREIGN PATENT DOCUMENTS

1441575  7/1976  United Kingdom .................... 55/55

Primary Examiner—Peter Hruskoci
Attorney, Agent, or Firm—Finnegan, Henderson, Farabow, Garrett and Dunner

[57] ABSTRACT

The invention provides a method of removing organic solvent from a solution containing an emulsifier capable of foaming. The pressure in a chamber, in which the solution is disposed, is reduced. The foaming condition of the solution in the chamber is detected. Thereafter, the reduced pressure is regulated in accordance with the foaming condition of the solution.

7 Claims, 1 Drawing Sheet

METHOD OF ORGANIC SOLVENT REMOVAL

BACKGROUND OF THE INVENTION

The present invention relates to a method of preparing an emulsion, more specifically to a method of efficient organic solvent removal in the production of an oil-in-water emulsion.

Oil-in-water emulsions are widely used to produce photographic light-sensitive materials, cosmetics, foods, paints, drugs and other items.

For example, in the production of a photographic light-sensitive material, an emulsion is prepared using oil-soluble substances such as a dye image forming compound (e.g., color coupler), a diffusion transfer compound, an antifogging agent, an antifading agent, a color mixing preventing agent, an ultraviolet absorbent and a color sensitizer. An oil-in-water emulsion of these oil-soluble substances is generally prepared by adding either oil-soluble substances along with an organic solvent or an emulsification aid or with an emulsification aid in solution in an organic solvent, or an oil-phase solution prepared by either heating an oil-soluble substance or dissolving it in an organic solvent when the oil-soluble substance is solid (hereinafter simply referred to as oil-phase solution) to an aqueous-phase solution containing a water-soluble binder supplemented with an emulsification aid added as necessary (hereinafter simply referred to as aqueous-phase solution) to yield an oil-in-water emulsion of about 0.1 to 1.0 $\mu$m in average grain size.

The organic solvent described above is often a solvent having a boiling point below that of water, such as ethyl acetate. Since this solvent becomes unnecessary upon completion of dispersion, it is removed by, for example, reducing the pressure in the emulsification tank with a vacuum pump connected thereto.

A variety of methods of organic solvent removal are known, of which the method in which the organic solvent is distilled off under reduced pressure ranks best since the other methods have disadvantages of low efficiency or speed of solvent removal, solution denaturation, increased equipment cost, etc.

On the other hand, many of the formulations used to produce photographic light-sensitive materials show a foaming property when emulsified and dispersed.

When such a foaming hydrophilic colloid solution is emulsified and dispersed, foam fills the emulsification tank and reduces the evaporation area, thus hampering the smooth removal of the solvent. In addition, when the solvent is to be removed by distillation under reduced pressure, the foam migrates into the exhaust piping, which results in significant loss and necessitates cleaning of the inside of the exhaust piping upon every completion of emulsification dispersion. Meanwhile, Japanese Patent Examined Publication No. 56010/1986 discloses the removal of organic solvent under reduced pressure wherein a reduced pressure of about 500 Torr is maintained in the initial stage, followed by further reducing the pressure to about 30 to 150 Torr 1 to 2 minutes later to reach a stationary reduced pressure condition.

However, validation experiments conducted by the present inventors revealed that this method causes significant loss of the emulsion due to severe foaming with rapid change in pressure and requires much labor to wash down the foam migrated into the exhaust piping.

SUMMARY OF THE INVENTION

With the aim of solving these problems, the object of the present invention is to provide a method of efficiently removing the organic solvent even when using a foaming hydrophilic colloid as the binder or even when using a foaming emulsifier.

The object of the present invention described above can be accomplished by a method of organic solvent removal for the production of an emulsion from a solution containing an organic solvent and a foaming emulsifier wherein the unnecessary organic solvent is removed under reduced pressure while controlling the degree of pressure reduction according to the state of foaming.

As stated above, the reduced pressure method is quite excellent in the removal of organic solvent, but it poses a major problem of foaming. The present invention is characterized by controlling the occurrence of foaming. Specifically, the degree of pressure reduction is controlled according to the state of foaming either by detecting the state of foaming using a foam sensor while avoiding the migration of the foam into the exhaust piping and adjusting the pressure, or by appropriately releasing the gas into the atmosphere.

The foam sensor described herein is subject to no limitation, as long as it is capable of foam detection. For example, a level sensor such as of the electrostatic capacity type can be applied. Accordingly, the sensor is set at such a position that the foam is prevented from entering the exhaust piping, and the degree of pressure reduction is controlled by the method described above upon the reach of the foam to that position.

Two sensors for maintaining the degree of pressure reduction and for releasing the pressure, respectively, may be used in combination.

DETAILED DESCRIPTION OF THE PREFERRED EMBODIMENT

Figure 1:
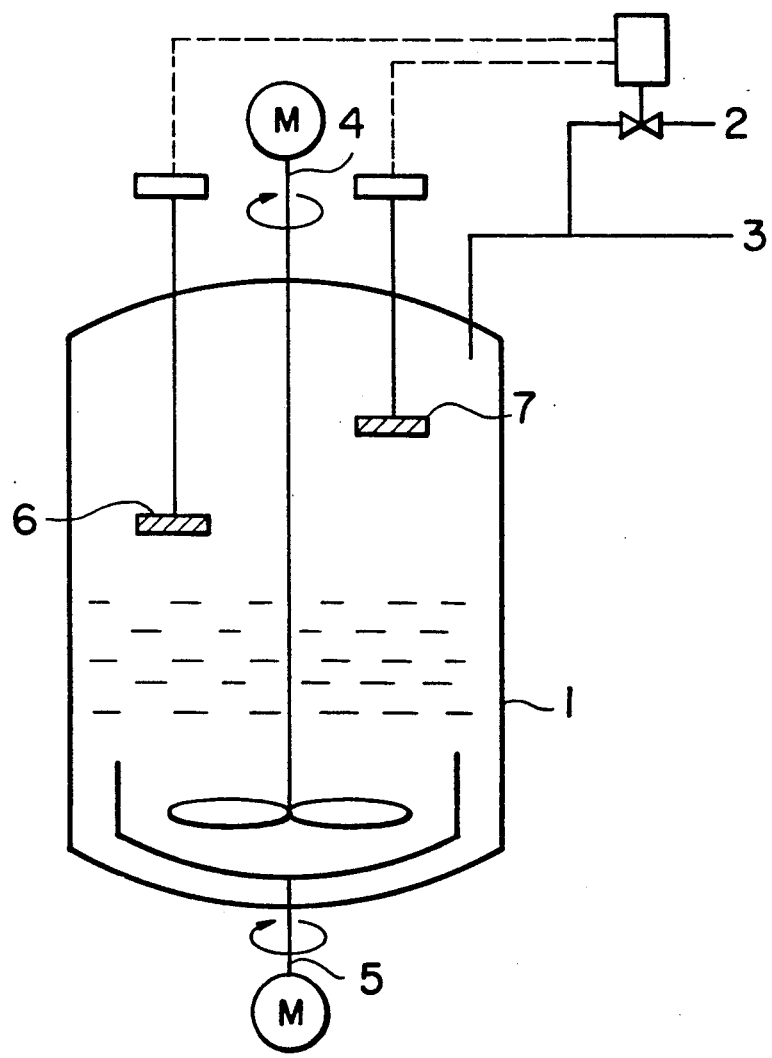
FIG. 1 is a cross-sectional view of an emulsification tank applicable to the present invention.

The present invention is hereinafter described in more detail to demonstrate its effect by means of the following examples, but these examples are not to be construed as limitative on the present invention.

EXAMPLE 1

Example 1

| Aqueous-phase solution | |
|---|---|
| 10% sodium dodecylbenzenesulfonate | 1.4 l |
| Photographic gelatin | 3.0 kg |
| Water | 27.0 l |
| Oil-phase solution | |
| 1-(2,4,6-trichlorophenyl)-3-[3-(3-(2,4-di-t-aminophenoxyacetamido)benzamido]-5-pyrazolone (coupler) | 3.0 kg |
| Tricresyl phosphate | 3.0 kg |
| Ethyl acetate | 6.0 l |

FIG. 1 is a cross-sectional view of a mechanical emulsifier for the present invention.

In FIG. 1, 1 is an emulsification tank, 2 is a pressure regulating valve, 3 is an exhaust piping, 4 and 5 are agitators, and 6 and 7 are foam sensors. The aqueous-phase solution and oil-phase solution described above are mixed using a pre-mixer.

After completion of pre-mixing, the mixture was charged in the emulsification tank illustrated in FIG. 1, and dispersed using the agitators 4 and 5 at a rotation speed of 2500 rpm for 50 minutes. The pressure in the emulsification tank 1 was thereafter reduced via the reduced pressure exhaust piping 3 to initiate solvent removal. As the pressure decreased, foaming occurred. When the foam was sensed by the sensor 6, a signal for maintaining the degree of pressure reduction was sent; when the foam sensor 7 located above the sensor 6 sensed the foam, a pressure of about 3 Torr was released into the atmosphere; when the foam level was again below the sensor 6, pressure reduction was again initiated. This procedure was repeated in cycles to regulate the degree of pressure reduction in the emulsification tank. As a result, the ethyl acetate removal rate was 99.5% at 70 minutes following initiation of pressure reduction. In addition, no foam adhesion occurred in the exhaust piping 3.

COMPARATIVE EXAMPLE 1

The procedure of Example 1 was followed but the pressure in the emulsification tank 1 was kept constant at 300 Torr from initiation of pressure reduction with no adjustment of the degree of pressure reduction in the tank. The ethyl acetate removal rate was 70% at 180 minutes following initiation of pressure reduction. In addition, significant foam adhesion was noted in the exhaust piping 3. This finding demonstrates a significantly lower solvent removal efficiency in comparison with Example.

The present invention provides a method of efficiently removing the organic solvent even when using a foaming hydrophilic colloid as the binder or when using a foaming emulsifier.

What is claimed is:

1. A method of removing organic solvent from a solution containing an emulsifier capable of exhibiting a foaming condition, comprising:
   reducing the pressure in a tank in which the solution is disposed to initiate solvent removal;
   detecting the foaming condition of the solution in said tank; and
   adjusting the pressure within said tank to control said foaming condition.

2. The method of claim 1, wherein the solution is an oil-in-water emulsion used for the production of a photographic light-sensitive material.

3. The method of claim 1, wherein the foaming condition is detected by a foam sensor.

4. The method of claim 3, wherein said foam sensor is a level sensor indicating the foam level in said chamber.

5. The method of claim 4, wherein there are provided two sets of said level sensor for detecting low and high levels.

6. The method of claim 5, wherein, when the high foam level, is detected, said tank is opened to the outside atmosphere to lower the reduced pressure.

7. The method of claim 6, wherein, when the low foam level, is detected, said reducing the pressure is restarted.

* * * * *